Nov. 8, 1927. 1,648,005
R. W. PRITCHARD
CORN POPPER AND METHOD OF POPPING CORN
Filed Oct. 28, 1922   5 Sheets-Sheet 2

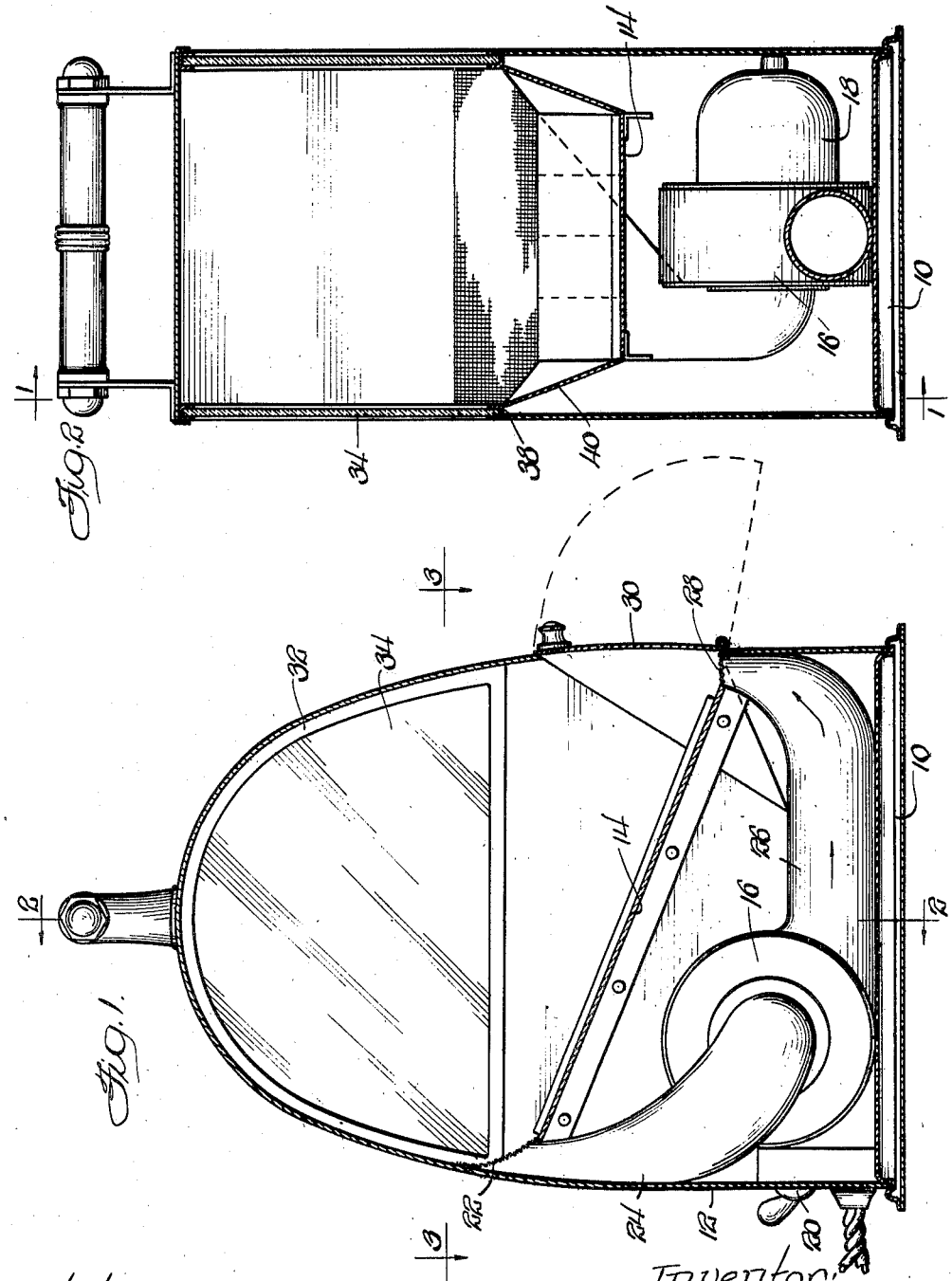

Inventor:
Ralph Waldo Pritchard

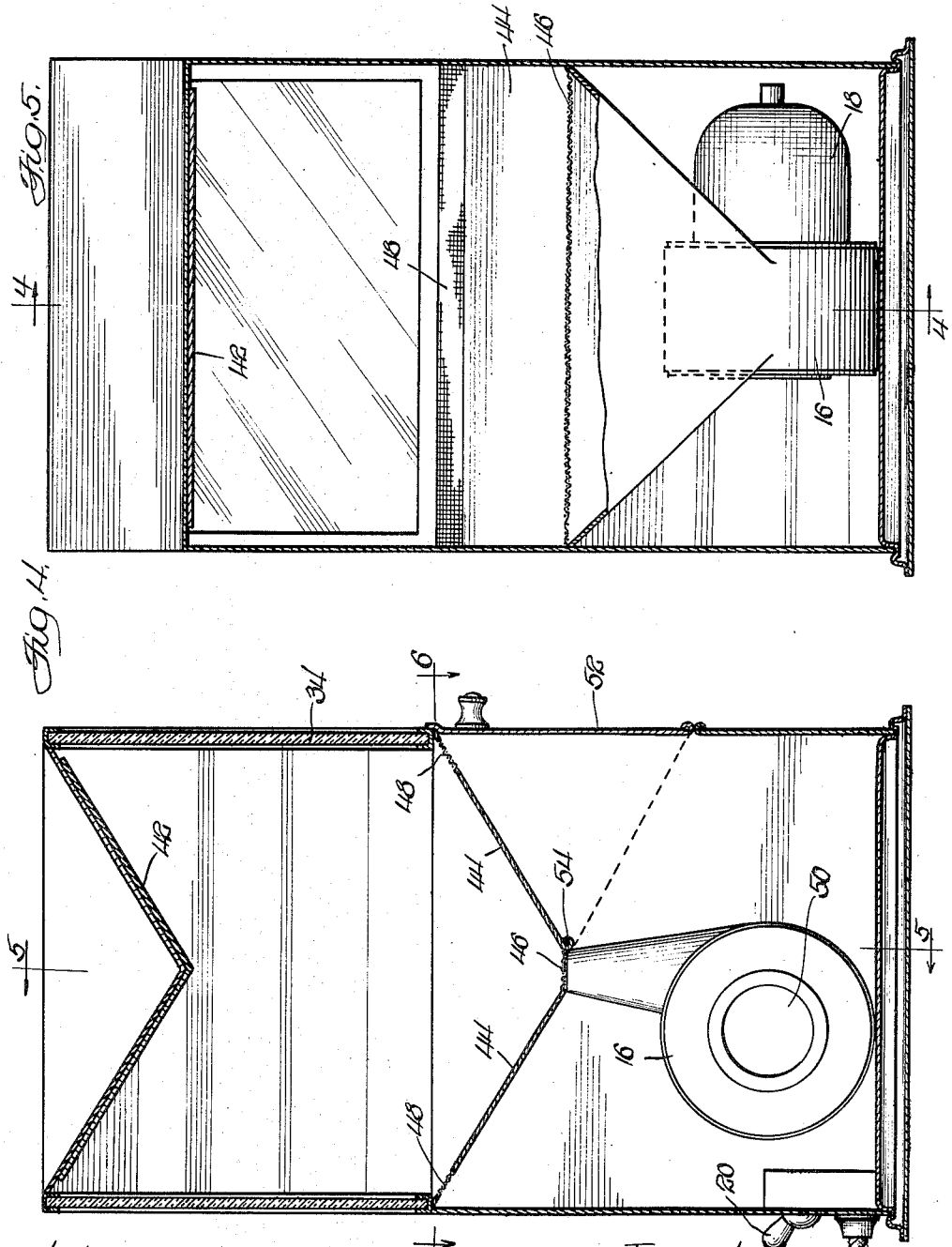

Nov. 8, 1927.  1,648,005
R. W. PRITCHARD
CORN POPPER AND METHOD OF POPPING CORN
Filed Oct. 28, 1922   5 Sheets-Sheet 4
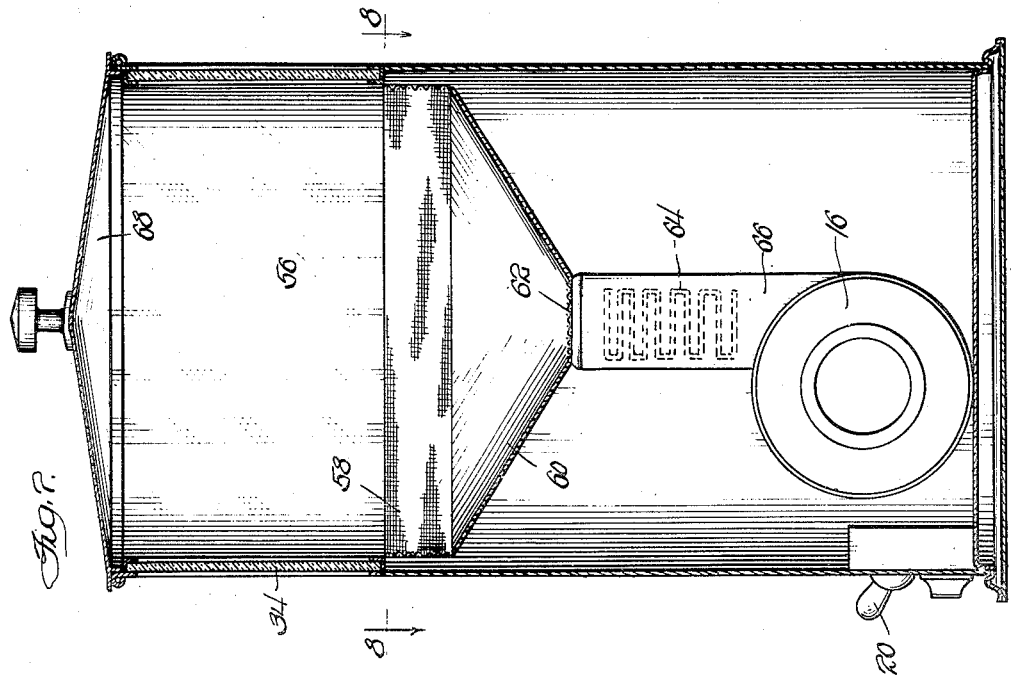
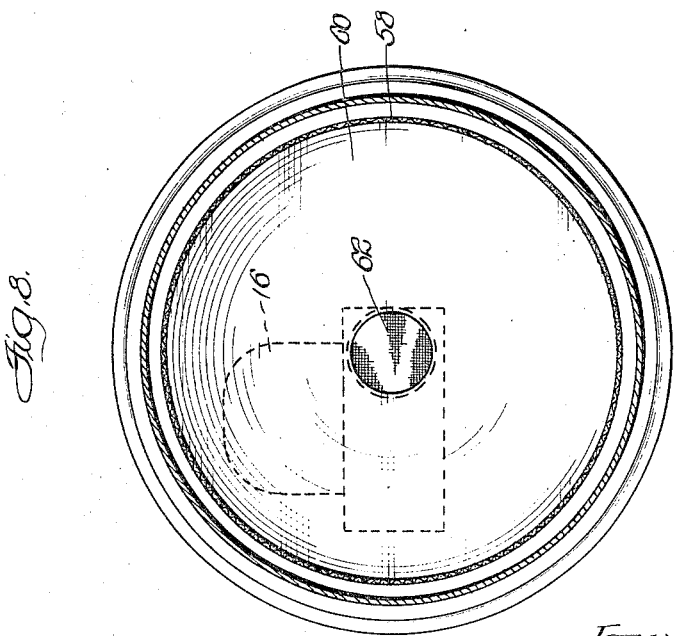
Inventor:
Ralph Waldo Pritchard

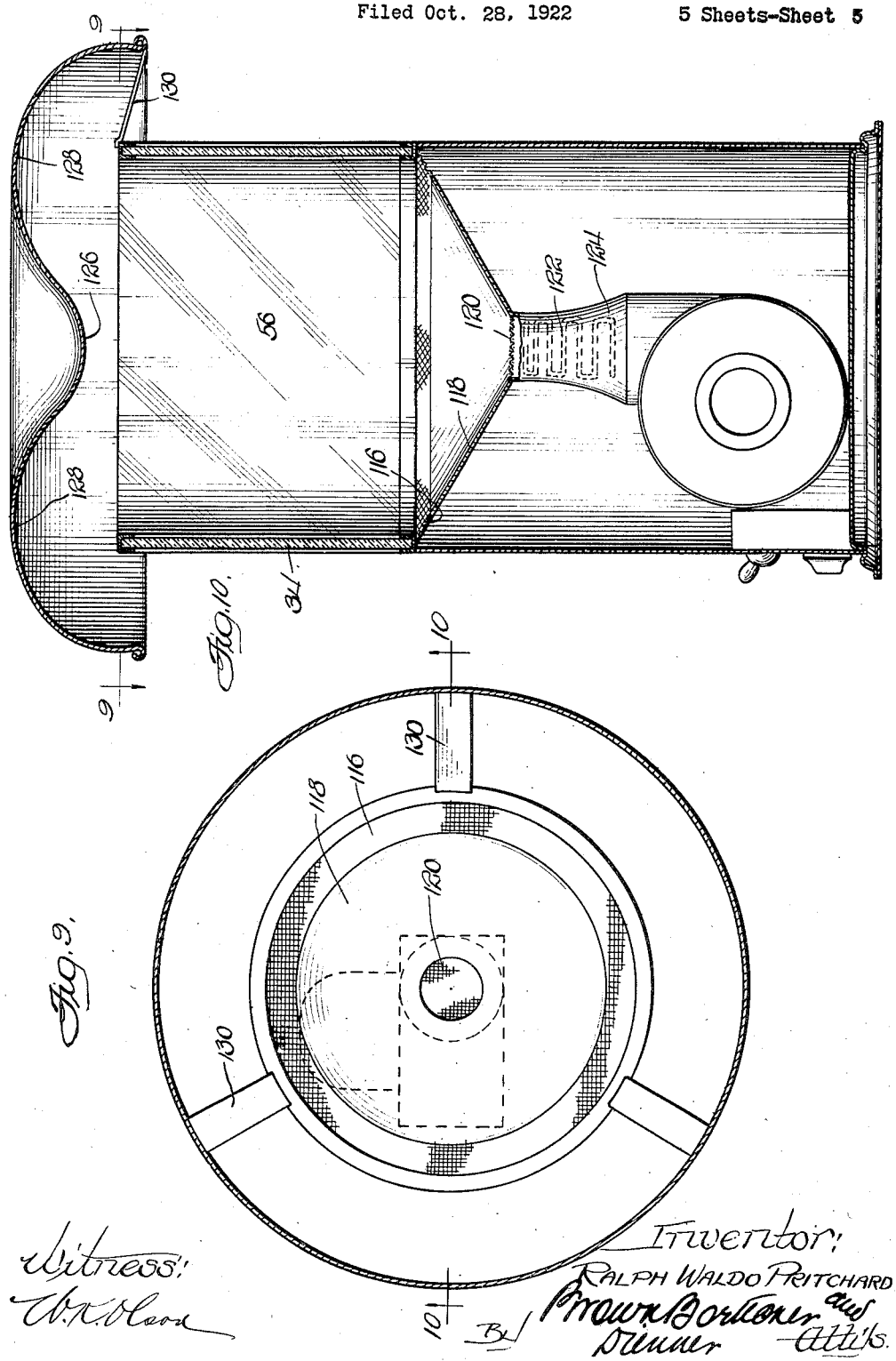

Patented Nov. 8, 1927.

1,648,005

UNITED STATES PATENT OFFICE.

RALPH W. PRITCHARD, OF CHICAGO, ILLINOIS.

CORN POPPER AND METHOD OF POPPING CORN.

Application filed October 28, 1922. Serial No. 597,448.

My invention relates to the art of preparing popcorn for consumption.

One object of the invention is to improve the quality of the popped corn.

Another object is to economize in the use of heat and power for performing the popping.

Another object is to provide simple, economical and durable equipment for popping corn according to my improved method. Further objects and advantages of the invention will become apparent as the description proceeds.

In the accompanying drawings;

Figure 1 is a side elevation partly in section of one embodiment of apparatus according to the invention;

Figs. 2 and 3 are sections on lines 2—2 and 3—3 respectively of Figure 1;

Figs. 4 and 5 are sectional views on lines 4—4 of Fig. 5 and 5—5 of Fig. 4 respectively, of another embodiment of apparatus according to the invention;

Fig. 7 is a view of a cylindrical popper;

Fig. 8 is a section on line 8—8 of Fig. 7; and

Figs. 9 and 10 are sectional views on lines 9—9 of Fig. 10 and 10—10 of Fig. 9 respectively, of another embodiment.

Figure 3:
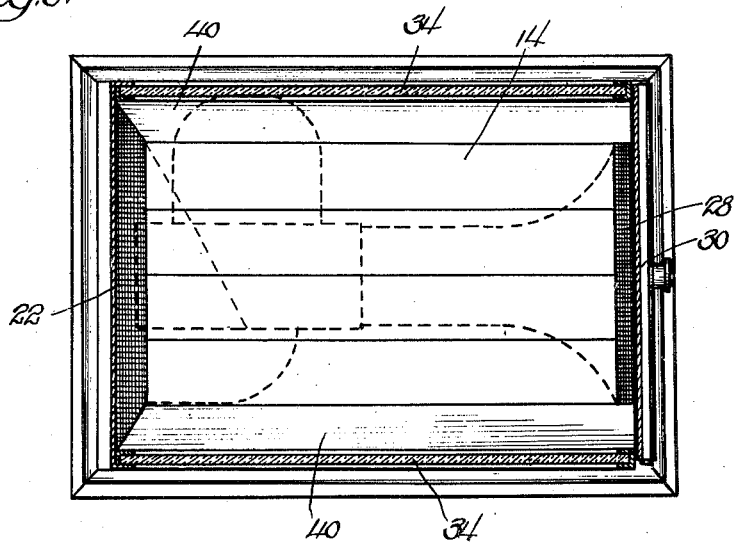

In the embodiment of apparatus according to my invention selected for illustration in Figs. 1, 2 and 3, a suitable base 10 supports a completely closed casing 12 divided into upper and lower compartments by an inclined electric heating plate 14. A small fan 16 below the heating plate, driven by an electric motor 18, under the control of the externally accessible switch 20 operates to withdraw air from the upper chamber through a screen 22 and duct 24; and to deliver the same air through duct 26 and screen 28 to the upper chamber at the lower end of the heating element 14, which is inclined substantially as shown in the drawings. The supply of electrical current to the heating element 14, is preferably controlled by switch 20.

In the operation of the device, a supply of popcorn is inserted in the upper chamber through door 30, and the switch is turned on. The jet of air rising through screen 28 will throw the kernels up into the curved dome 32 where they will be deflected toward the other side of the chamber and fall again at the upper end of the heating element 14. As they roll down the plate they will be heated, partly by mechanical contact, but chiefly by radiation from a very hot surface close to them. In this way a relatively small amount of heat is delivered to the air in the casing, and the kernels are popped with a minimum expenditure of heat energy.

The sidewalls of the dome are preferably glass panels 34 ending at 38. This makes the operation of the device an attractive display.

When the batch is popped, door 30 is opened to remove it.

Figure 6:
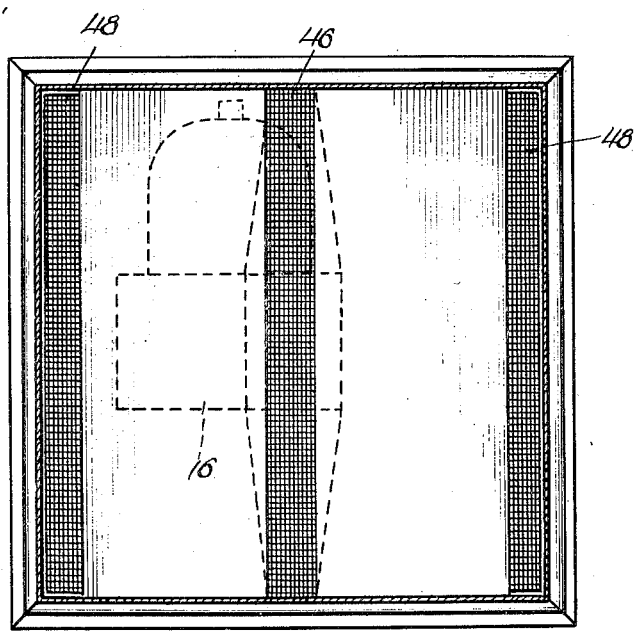
Fig. 6 is a section on line 6—6 of Fig. 4.

Referring now to Figs. 4, 5 and 6, I have positioned the heating plate 42 at the top of the upper chamber in the form of an inverted V. At the bottom of the chamber V-shaped guide plate 44 directs the falling kernels to the center where they pass over screen 46 and are blown up against plate 42 by the jet of air. The air returns to the lower chamber through screen 48 at the side to the intake 50 of the fan 16.

Door 52, in this instance, opens below the diaphragm formed by plate 44. One of these plates, is accordingly hinged at 54. Upon opening door 52, the adjacent diaphragm plate 44 will swing down to permit convenient and quick insertion or removal of a batch of corn.

Referring now to Figs. 7 and 8, I have illustrated a cylindrical unit, designed for top delivery. The insulated chamber 56 is continued downwardly by a periphery 58 joined at its lower edge to a conical bottom 60 sloping down to a central screen 62 through which the jet delivered by fan 16 enters. In this embodiment heat is delivered to the kernels through the medium of the air, by means of a heating element 64 positioned in conduit 66. While this requires a slightly larger power input, it has the advantage that accidental failure of the motor and fan to operate, will, if the unit is properly designed, not burn up or destroy, either the heating element or the popcorn, so as to foul or otherwise injure the popper. Lid 68 is made removable for the insertion and withdrawal of the material.

The unit illustrated in Figs. 9 and 10 also effects a continuous separation of popped from unpopped kernels. Chamber 56 is a substantial duplicate of chamber 56 in Fig. 7, but the return screen 116 forms part of the conical diaphragm 118, instead of being a vertical continuation of the walls of the chamber 56. Inlet screen 120 provides for the entry of the jet heated by heating coil 122 in nozzle 124. The cover is curved to form a central downwardly projecting boss 126. It will be apparent that the jet rising from nozzle 124 will continue toward this boss, and then spread outwardly to return in an annular stream adjacent the periphery of chamber 56. The cover is curved upward at 128 to provide a wide annular passage over the upper edge of the wall of chamber 56. By properly designing the parts, the force of the jet may be made such that popped kernels, on account of their large volume and relatively small mass, will be thrown by the jet out over the edges of the sidewall of chamber 56, passing under portion 128 of the cover to fall downwardly outside the chamber.

The cover is preferably removably supported by a plurality of radial arms 130, and the popped corn is preferably received in an ordinary pan (not shown) in which the entire popper may be set. Alternatively, an annular dish might be mounted on the outside of chamber 56.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. In combination, a chamber in which the kernels to be popped are placed, a heating element positioned in the said chamber, the said heating element being inclined so as to cause the kernels in the chamber to gravitate from its uppermost portion down to its lowermost portion, a screen positioned intermediate the uppermost portion of the heating element and a wall of the chamber, a screen positioned intermediate the lowermost portion of the inclined heating element and the wall of the chamber, and means for circulating a current of air from the lower screen to the higher screen to agitate the kernels in the chamber up and down the heating element.

2. In combination, a chamber in which kernels to be popped are placed, a heating element disposed in an inclined position within the said chamber, a screen positioned intermediate the wall of the chamber and the uppermost portion of the inclined element, a screen positioned intermediate the wall of the chamber and the lowermost portion of the element, means for forcing a current of air through the lowermost screen into the chamber, and means for sucking the current of air from the chamber through the upper screen, thereby causing the current of air to circulate through the chamber, the said circulation of the current of air agitating the kernels in the chamber to cause them to have a light rolling contact with the heating element for a short period of time.

3. The method of popping kernels of corn which consists in conducting each of the kernels of corn down an inclined highly heated surface and blowing each of the kernels in an arcuate path back to the top of the inclined heating surface.

4. In combination, a chamber in which kernels to be popped are placed, an inclined supporting surface for the kernels, means connected to the lower end of said surface for blowing air over the surface to agitate the kernels in the chamber, and heating means for applying heat to the kernels in the chamber.

In witness whereof, I hereunto subscribe my name this 25 day of October, 1922.

R. W. PRITCHARD.